United States Patent
Ishiyama et al.

(10) Patent No.: US 8,199,147 B2
(45) Date of Patent: Jun. 12, 2012

(54) THREE-DIMENSIONAL DISPLAY APPARATUS, METHOD, AND PROGRAM

(75) Inventors: Eiji Ishiyama, Kurokawa-gun (JP); Kouichi Yahagi, Kurokawa-gun (JP); Tomonori Masuda, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/120,530

(22) PCT Filed: Sep. 25, 2009

(86) PCT No.: PCT/JP2009/004869
§ 371 (c)(1),
(2), (4) Date: Mar. 23, 2011

(87) PCT Pub. No.: WO2010/038388
PCT Pub. Date: Apr. 8, 2010

(65) Prior Publication Data
US 2011/0169825 A1    Jul. 14, 2011

(30) Foreign Application Priority Data
Sep. 30, 2008  (JP) ................................ 2008-253795

(51) Int. Cl.
*G06T 15/00* (2011.01)
*G09G 5/00* (2006.01)

(52) U.S. Cl. ......... 345/419; 345/630; 345/634; 345/635

(58) Field of Classification Search .................. 345/419, 345/629, 630, 634, 635
See application file for complete search history.

(56) References Cited

U.S. PATENT DOCUMENTS

| | | | | |
|---|---|---|---|---|
| 5,379,369 | A | * | 1/1995 | Komma et al. ............... 345/419 |
| 5,570,208 | A | * | 10/1996 | Kato et al. ...................... 359/23 |
| 5,583,345 | A | * | 12/1996 | Kohgami et al. ............. 250/580 |
| 5,929,859 | A | * | 7/1999 | Meijers ......................... 345/419 |
| 6,111,597 | A | * | 8/2000 | Tabata ............................ 348/43 |
| 6,388,754 | B1 | * | 5/2002 | Nishikawa et al. ........... 356/601 |
| 6,445,814 | B2 | * | 9/2002 | Iijima et al. ................... 382/154 |
| 7,706,972 | B2 | | 4/2010 | Matsuo et al. |
| 2002/0126396 | A1 | * | 9/2002 | Dolgoff ........................ 359/743 |
| 2004/0208357 | A1 | * | 10/2004 | Tokuhashi et al. ............ 382/154 |
| 2005/0129325 | A1 | * | 6/2005 | Wu ................................ 382/254 |

(Continued)

FOREIGN PATENT DOCUMENTS
JP          07-264633 A         10/1995
(Continued)

*Primary Examiner* — David T Welch
(74) *Attorney, Agent, or Firm* — Sughrue Mion, PLLC

(57) ABSTRACT

A subject is imaged at a predetermined time interval by a plurality of imaging units which obtains a plurality of images having a parallax of a subject viewed from different viewpoints by imaging the subject from different viewpoints. An evaluation value which includes at least one of a luminance and a high frequency component of the images obtained by the imaging units at the predetermined time interval is calculated. When the evaluation value has changed by an amount exceeding a predetermined threshold value, the distance information calculation and three-dimensional processing on the plurality of images and object are performed. Here, a relative position of the object with respect to the three-dimensional image in a three-dimensional space is changed based on the distance information such that overlapping of the object and the three-dimensional image on top of each other is prevented when the three-dimensional display is performed.

16 Claims, 12 Drawing Sheets

U.S. PATENT DOCUMENTS

| | | | |
|---|---|---|---|
| 2005/0219239 A1* | 10/2005 | Mashitani et al. | 345/419 |
| 2006/0066718 A1* | 3/2006 | Yanagawa et al. | 348/51 |
| 2006/0192776 A1* | 8/2006 | Nomura et al. | 345/419 |
| 2006/0239509 A1* | 10/2006 | Saito | 382/104 |
| 2007/0285554 A1* | 12/2007 | Givon | 348/340 |
| 2008/0186308 A1* | 8/2008 | Suzuki et al. | 345/419 |
| 2009/0033753 A1* | 2/2009 | Sato et al. | 348/217.1 |
| 2009/0040138 A1* | 2/2009 | Takahashi et al. | 345/32 |

FOREIGN PATENT DOCUMENTS

| | | |
|---|---|---|
| JP | 2005-065162 A | 3/2005 |
| JP | 2005-122501 A | 5/2005 |
| JP | 2006-325165 A | 11/2006 |
| JP | 2006-337441 A | 12/2006 |

* cited by examiner

FIG.2
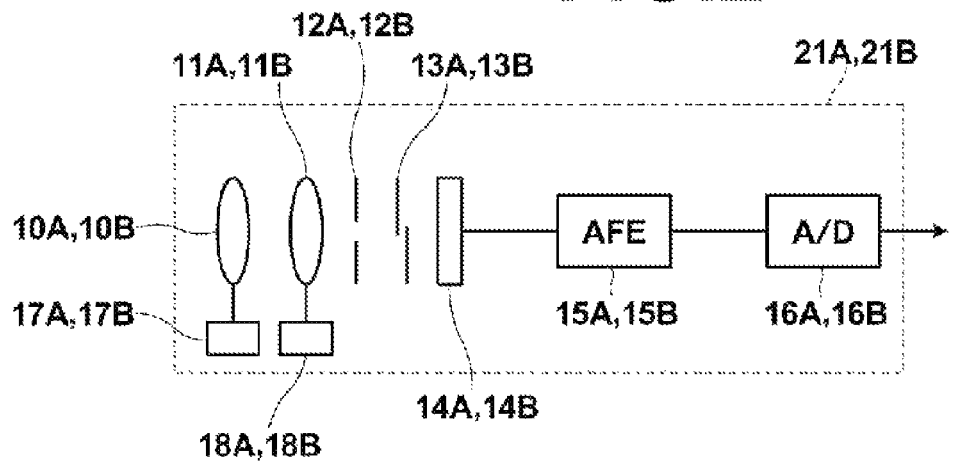
FIG.3
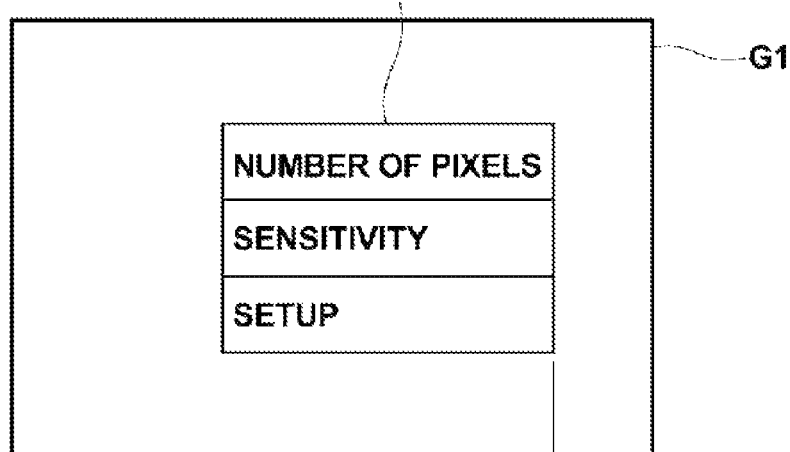
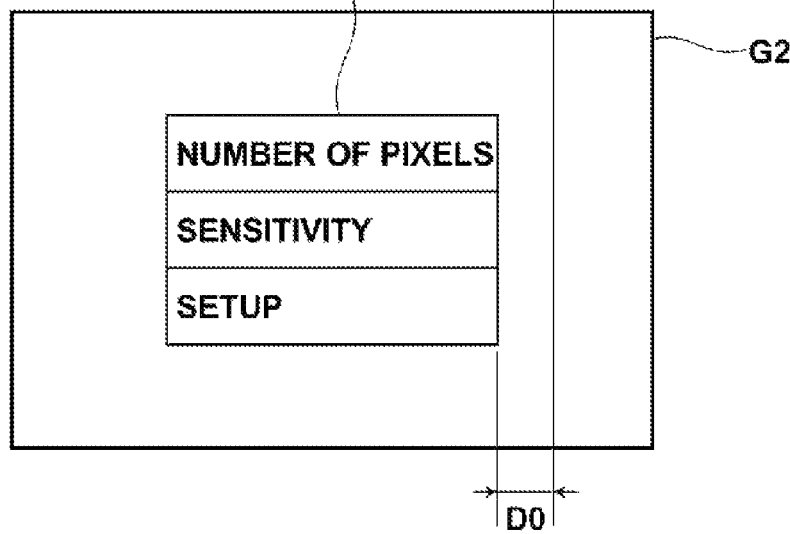

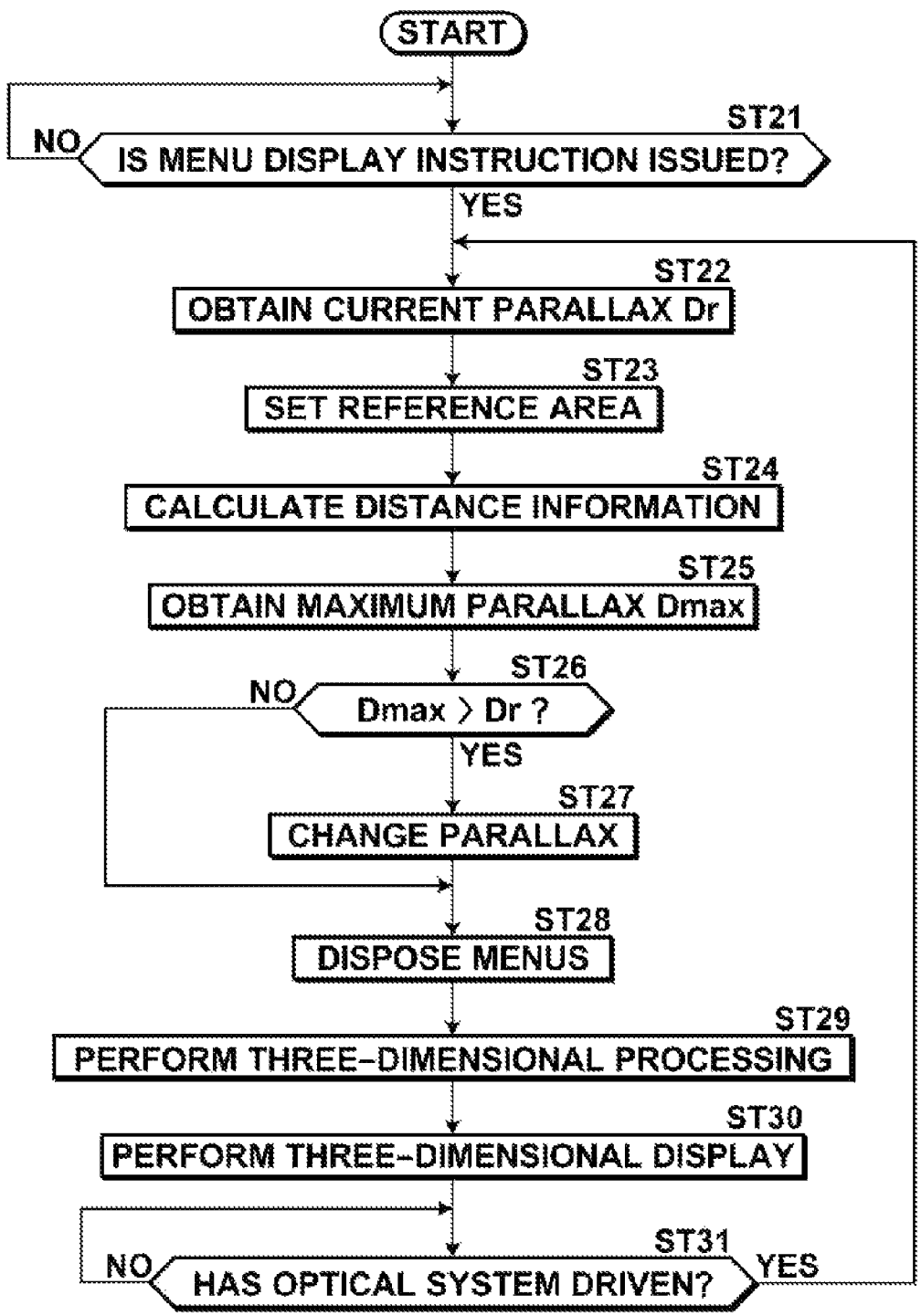

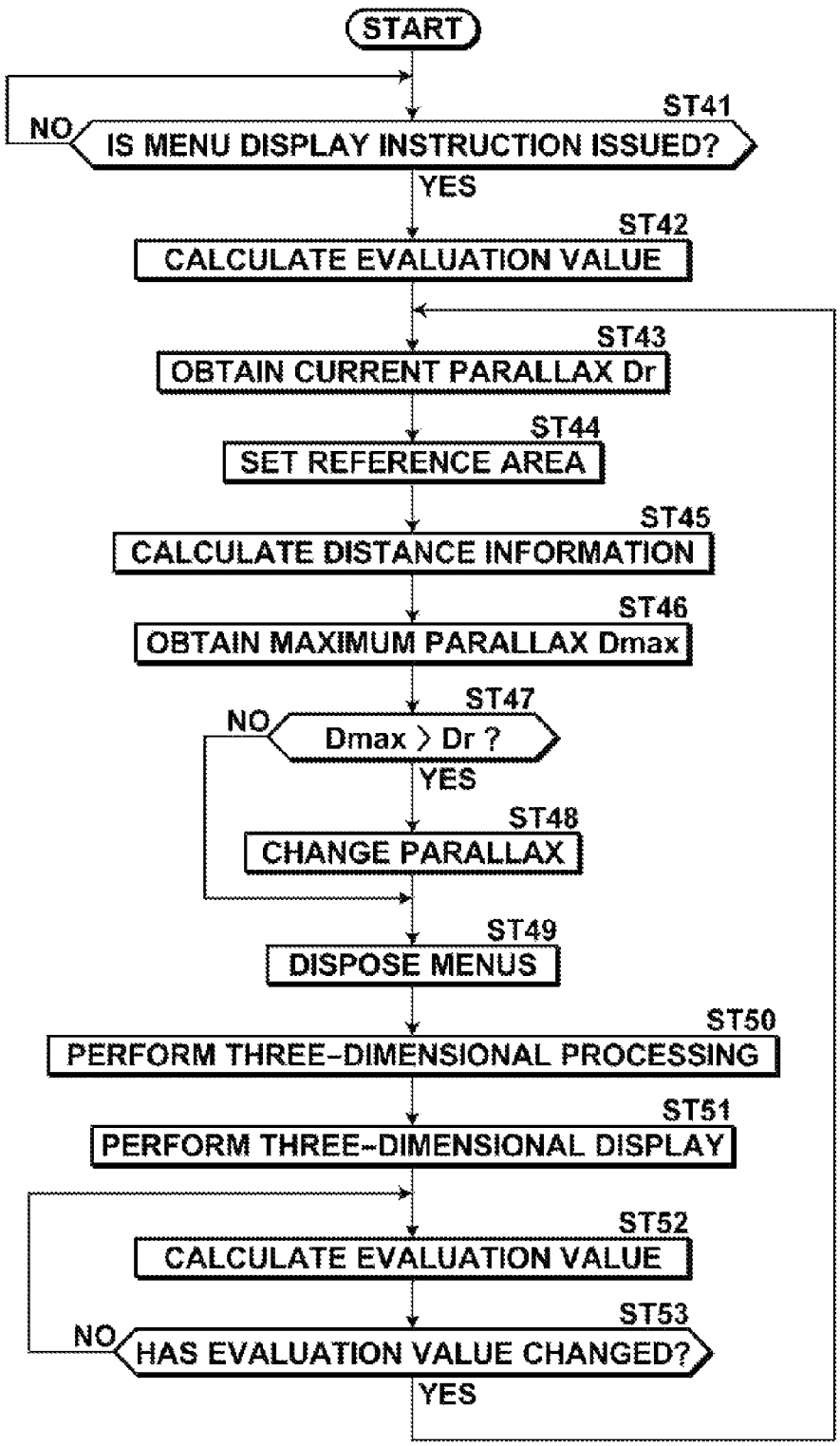

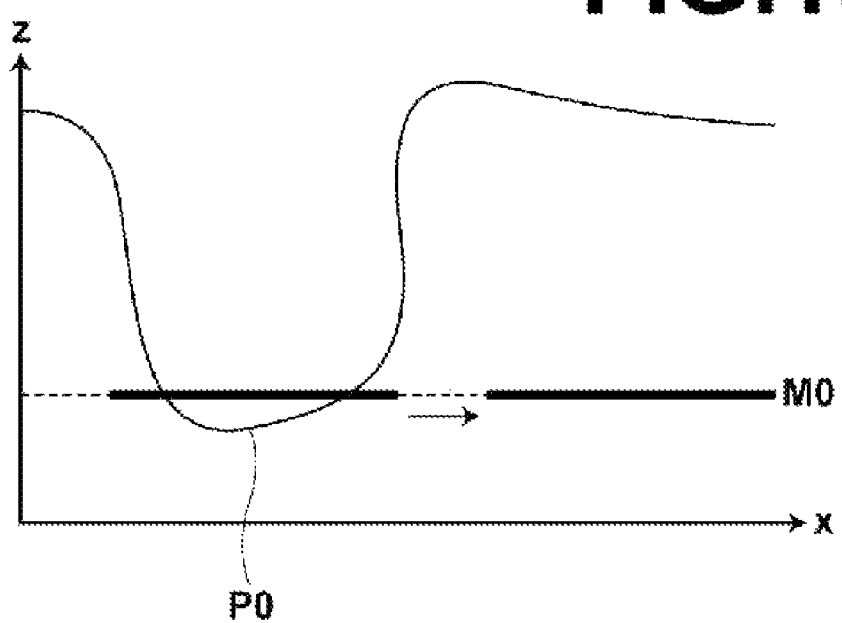

THREE-DIMENSIONAL DISPLAY APPARATUS, METHOD, AND PROGRAM

This is a National Stage Entry of Application No. PCT/JP2009/004869 filed Sep. 25, 2009, claiming priority based on Japanese Patent Application No. 2008-253795 filed Sep. 30, 2008, the contents of all of which are incorporated herein by reference in their entirety.

TECHNICAL FIELD

The present invention relates to a three-dimensional display apparatus and method for three-dimensionally displaying a plurality of images so as to be stereoscopically viewable. The invention also relates to a program for causing a computer to perform the three-dimensional display method.

BACKGROUND ART

It is known that three-dimensional display of a plurality of combined images may provide a parallax-based stereo vision. Such stereo vision may be realized by imaging the same subject from different positions using a plurality of cameras to obtain a plurality of images, and three-dimensionally displaying the plurality of images using a parallax between each of the plurality of images.

More specifically, for a method that realizes stereo vision by naked eye parallel viewing, the three-dimensional display may be implemented by arranging a plurality of images side by side. Further, a plurality of images may be combined and displayed three-dimensionally by superimposing a plurality of images having different colors, e.g., red and blue, or by superimposing a plurality of images having different polarization directions. In this case, the stereo vision may be realized by fusion viewing the three-dimensionally displayed image through the auto focus function of the eyes using image separation glasses, such as red-blue glasses, polarized glasses, or the like (anaglyph method, polarizing filter system).

Further, it is also possible to realize the stereo vision by displaying a plurality of images on a three-dimensional display monitor capable of providing stereo vision without using the polarizing glasses or the like as in the parallax barrier system and lenticular system. In this case, the three-dimensional display is implemented by vertically cutting a plurality of images in strips and alternately disposing the strips. Still further, a method that performs a three-dimensional display by changing the light beam direction in left and right images through the use of an image separation glasses or application of an optical element on the liquid crystal and alternately displaying the left and right images is also proposed (scan backlight method).

In addition, a compound eye camera which has a plurality of imaging units and performs imaging for the three-dimensional display is proposed. Such a compound eye camera includes a three-dimensional display monitor, and is capable of generating a three-dimensional image for a three-dimensional display from images obtained by the plurality of imaging units and three-dimensionally displaying the generated three-dimensional image on the three-dimensional display monitor.

Such a compound eye camera needs to display a camera setting menu, imaging conditions, such as F number and shutter speed at the time of imaging, characters representing the number of images taken and date and time of imaging, icons indicating anti-camera shaking, ON/OFF of flash light, portrait mode, and the like, and objects such as pictogram. The photographer may confirm the date and time of imaging, the number of images taken, the imaging conditions at the time of imaging, and the like by confirming such objects.

Here, when displaying such an object in three-dimensional display, if the object is displayed three-dimensionally by arranging them in each of a plurality of images so as to have a parallax, not only the image but also the object is stereoscopically viewable. In this respect, a method in which depth information is give in advance to objects to be displayed, then depth information of a specified object is compared to that of the other objects, and the depth information of the specified object is changed such that the specified object is displayed in front of the other objects is proposed as described, for example, in Japanese Unexamined Patent Publication No. 2005-065162. Further, a method in which, when three-dimensionally displaying an object specified among a plurality of two-dimensionally displayed objects, positions and sizes of the specified object and an object likely to overlap with the specified object, and the amount of parallax between the objects are changed so that the specified object does not overlap with the other objects is proposes as described, for example, in Japanese Unexamined Patent Publication No. 2005-122501.

When displaying an object in a three-dimensionally displayed three-dimensional image, the object is three-dimensionally displayed so as to have a predetermined stereoscopic appearance. If a stereoscopic appearance of a certain portion of a three-dimensionally displayed three-dimensional image is greater than that of the object, however, the object overlaps with the portion and appears to be sunk in the portion. Where the object is formed of only characters or the background of the object is semitransparent or transparent and if the object overlaps with a certain portion of the three-dimensional image, in particular, the three-dimensional image appears very unnatural in which the portion appears to be transparent even though the object appears to be in the back of the portion located in front.

In the method described in Japanese Unexamined Patent Publication No. 2005-065162, distance information is given in advance to both the three-dimensional image and object. If distance information is not given to an image to be three-dimensionally displayed, therefore, it can not be known how the stereoscopic appearance of the object is to be changed. The method described in Japanese Unexamined Patent Publication No. 2005-122501 is a method for preventing objects from overlapping when a certain object included in an image is three-dimensionally displayed and, therefore, the method can not be applied to a case in which the entire image is three-dimensionally displayed.

The present invention has been developed in view of the circumstances described above, and it is an object of the present invention to display, when an object is displayed in a three-dimensionally displayed image, the object without causing uncomfortable feeling arising from the overlapping of the three-dimensional image and the object on top of each other.

DISCLOSURE OF INVENTION

A three-dimensional display apparatus of the present invention is an apparatus, including:

an image obtaining means for obtaining a plurality of images having a parallax with respect to a subject viewed from different viewpoints;

a three-dimensional processing means for performing three-dimensional processing for three-dimensional display on the plurality of images and performing the three-dimensional processing on an object to be displayed in the three-dimensionally displayed three-dimensional image in a superimposed manner;

a display means for performing various displays, including a three-dimensional display of the three-dimensional image, that is, at least the three-dimensional display of the three-dimensional image; and a distance information calculation means for calculating distance information of the three-dimensional image, wherein the three-dimensional processing means is a means that changes a relative position of the object with respect to the three-dimensional image in a three-dimensional space based on the distance information such that overlapping of the object and the three-dimensional image on top of each other is prevented when the three-dimensional display is performed.

Here, the three-dimensional processing on the plurality of images and the three-dimensional processing on the object may be performed at the same time or separately. That is, the object may be superimposed on the plurality of images first and then the three-dimensional processing may be performed on the plurality of images and object at the same time, or the three-dimensional processing may be performed on the plurality of images and object separately first and then the object is superimposed on the three-dimensionally processed three-dimensional image.

The term "position in a three-dimensional space" as used herein includes not only a position in a depth direction but also a position in a two-dimensional direction orthogonal to a depth direction when the three-dimensionally displayed image is viewed stereoscopically.

In the three-dimensional display apparatus of the present invention, the distance information calculation means may be a means that calculates the distance information for each pixel in a reference area where the object is displayed in a reference image serving as a reference of the plurality of images, and the three-dimensional processing means may a means that changes a relative position of the object in a depth direction with respect to the three-dimensional image in the three-dimensional space based on the distance information in the reference area such that the object is three-dimensionally displayed at a position on the front side of the three-dimensional image.

Further, in the three-dimensional display apparatus of the present invention, the distance information calculation means may be a means that calculates a parallax of corresponding points between each of the plurality of images as the distance information.

In this case, the distance information calculation means may be a means that extracts a characteristic portion of the plurality of images and calculates the parallax of corresponding points from the characteristic portion.

Further, in the three-dimensional display apparatus of the present invention, when the plurality of images is a plurality of images obtained by imaging, the distance information calculation means may be a means that calculates the distance information based on an imaging condition at the time of imaging the plurality of images.

Still further, in the three-dimensional display apparatus of the present invention, the three-dimensional processing means may be a means that performs the three-dimensional processing on the object so as to have a parallax greater than or equal to a maximum parallax of the parallaxes of the corresponding points calculated in the reference area.

Further, in the three-dimensional display apparatus of the present invention, the three-dimensional processing means may be a means that, when the three-dimensional processing is performed on the object so as to have a predetermined parallax, performs the three-dimensional processing on the plurality of images such that a maximum parallax of the parallaxes of the corresponding points calculated in the reference area becomes less than or equal to the predetermined parallax.

Still further, in the three-dimensional display apparatus of the present invention, the three-dimensional processing means may be a means that changes a position of the object in a direction orthogonal to a depth direction in the three-dimensional space based on the distance information such that the object is displayed at a position where overlapping of the object and the three-dimensional image on top of each other is prevented.

Further, in the three-dimensional display apparatus of the present invention, the distance calculation means may be a means that calculates a parallax of corresponding points between each of the plurality of images as the distance information.

In this case, the distance information calculation means may be a means that extracts a characteristic portion of the plurality of images and calculates the parallax of corresponding points from the characteristic portion.

In the three-dimensional display apparatus of the present invention, the image obtaining means may be a plurality of imaging means that obtains the plurality of images by imaging the subject from different viewpoints.

Further, the three-dimensional display apparatus of the present invention may further include a control means for controlling the distance information calculation means and the three-dimensional processing means to respectively perform the calculation of distance information and the three-dimensional processing on the plurality of images and the object at a predetermined time interval.

Still further, the three-dimensional display apparatus of the present invention may further include a control means for controlling the distance information calculation means and the three-dimensional processing means to respectively perform the calculation of distance information and the three-dimensional processing on the plurality of images and the object when an optical system of the imaging means is driven.

Further, the three-dimensional display apparatus of the present invention may further include an imaging control means for controlling the imaging means to image the subject at a predetermined time interval, an evaluation value calculation means for calculating an evaluation value which includes an evaluation value of at least one of a luminance and a high frequency component of the images obtained by the imaging means at the predetermined time interval, and a control means for controlling the distance information calculation means and the three-dimensional processing means to respectively perform the calculation of distance information and the three-dimensional processing on the plurality of images and the object when the evaluation value has changed by an amount exceeding a predetermined threshold value.

A three-dimensional display method of the present invention is a method for use with a three-dimensional display apparatus which includes an image obtaining means for obtaining a plurality of images having a parallax with respect to a subject viewed from different viewpoints, a three-dimensional processing means for performing three-dimensional processing for three-dimensional display on the plurality of images and performing the three-dimensional processing on an object to be displayed in the three-dimensionally displayed three-dimensional image in a superimposed manner, and a display means for performing at least the three-dimensional display of the three-dimensional image, the method including the steps of:

calculating distance information of the three-dimensional image; and changing a relative position of the object with respect to the three-dimensional image in a three-dimensional space based on the distance information such that overlapping of the object and the three-dimensional image on top of each other is prevented when the three-dimensional display is performed.

The three-dimensional display method of the present invention may be provided in the form of a program for causing a computer to perform the method.

Another three-dimensional display apparatus of the present invention is an apparatus, including:

an image obtaining means for obtaining a plurality of images having a parallax with respect to a subject viewed from different viewpoints;

a three-dimensional processing means for performing three-dimensional processing on the plurality of images for a three-dimensional display and performing the three-dimensional processing on an object to be displayed in a three-dimensional image of the three-dimensional display in a superimposed manner;

a display means for performing at least the three-dimensional display of the three-dimensional image; and a distance information calculation means for calculating distance information of the three-dimensional image, wherein the three-dimensional processing means is a means that changes a relative position of the object with respect to the three-dimensional image in a three-dimensional space based on the distance information such that a positional relationship in which a portion or a whole of the object is hidden by the three-dimensional image is prevented when the three-dimensional display is performed.

According to the present invention, distance information of a three-dimensional image to be displayed three-dimensionally is obtained and a relative position of an object with respect to the three-dimensional image in a three-dimensional space is changed based on the distance information in order to prevent overlapping of the object and the three-dimensional image on top of each other at the time of three-dimensional display. This allows the object to be three-dimensionally displayed without overlapping with the three-dimensional image on top of each other even when distance information of the three-dimensionally displayed three-dimensional image is not known.

Further, by calculating the distance information for each pixel in a reference area where the object is displayed in a reference image serving as a reference of the plurality of images and changing a relative position of the object in a depth direction with respect to the three-dimensional image in the three-dimensional space based on the distance information in the reference area such that the object is three-dimensionally displayed at a position on the front side of the three-dimensional image, the object may be three-dimensionally displayed on the front side of the three-dimensional image without overlapping with the three-dimensional image on top of each other.

Still further, by calculating a parallax of corresponding points between each of the plurality of images as the distance information, the distance at the corresponding points of the plurality of images may be calculated accurately.

In this case, by extracting a characteristic portion of the plurality of images and calculating the parallax of corresponding points from the characteristic portion, the distance information may be calculated with a small amount of calculation, whereby processing time may be reduced.

Further, when the plurality of images is a plurality of images obtained by imaging, by calculating the distance information based on an imaging condition at the time of imaging the plurality of images, the distance information may be calculated by a smaller amount of calculation in comparison with a case in which the distance information is calculated based on the corresponding points, whereby processing time may be reduced.

Still further, by changing a position of the object in a direction orthogonal to a depth direction in the three-dimensional space based on the distance information such that the object is displayed at a position where overlapping of the object and the three-dimensional image on top of each other is prevented, the object may be three-dimensionally displayed without overlapping with the three-dimensional image on top of each other, while stereoscopic appearances of the three-dimensional image and the object remain unchanged.

Further, by performing the calculation of distance information and the three-dimensional processing on the plurality of images and the object at a predetermined time interval, the object may be three-dimensionally displayed without overlapping with the three-dimensional image on top of each other even when the subject under imaging has moved and hence the stereoscopic appearance of the three-dimensional image to be displayed three-dimensionally has changed.

Still further, by performing the calculation of distance information and the three-dimensional processing on the plurality of images and the object when an optical system of the imaging means is driven, the object may be three-dimensionally displayed without overlapping with the three-dimensional image on top of each other even when the zoom and focus positions have changed and hence the three-dimensional image to be displayed three-dimensionally has changed.

Further, by calculating an evaluation value which includes an evaluation value of at least one of a luminance and a high frequency component of the images obtained by the imaging means at the predetermined time interval and performing the calculation of distance information and the three-dimensional processing on the plurality of images and the object when the evaluation value has changed by an amount exceeding a predetermined threshold value, the object may be three-dimensionally displayed without overlapping with the three-dimensional image on top of each other even when the brightness and/or focus position of the captured image has changed and hence the three-dimensional image to be displayed three-dimensionally has changed.

BEST MODE FOR CARRYING OUT THE INVENTION

Hereinafter, embodiments of the present invention will be described with reference to the accompanying drawings. FIG. 1 is a schematic block diagram of a compound eye camera to which a three-dimensional display apparatus according to a first embodiment of the present invention is applied, illustrating the internal configuration thereof. As illustrated in FIG. 1, compound eye camera 1 according to the first embodiment includes two imaging units 21A, 21B, imaging control unit 22, image processing unit 23, compression/expansion unit 24, frame memory 25, medium control unit 26, internal memory 27, and display control unit 28. Imaging units 21A, 21B are disposed so as to be able to image a subject with a predetermined baseline length and a convergence angle. The positions of imaging units 21A, 21B in the vertical direction are the same.

FIG. 2 illustrates a configuration of imaging units 21A, 21B. As illustrated in FIG. 2, imaging units 21A, 21B include focus lenses 10A, 10B, zoom lenses 11A, 11B, apertures 12A, 12B, shutters 13A, 13B, CCDs 14A, 14B, analog front ends (AFE) 15A, 15B, and A/D conversion units 16A, 16B respectively. Further, imaging units 21A, 21B respectively include focus lens drive units 17A, 17B for driving focus lenses 10A, 10B respectively and zoom lens drive units 18A, 18B for driving zoom lenses 11A, 11B respectively.

Focus lenses 10A, 10B are lenses for bringing a subject into focus and movable in optical axis directions by focus lens drive units 17A, 17B, each including a motor and a motor driver. Focus lens drive units 17A, 17B control the movement of focus lenses 10A, 10B based on focus data obtained by AF processing performed by imaging control unit 22 to be described later.

Zoom lenses 11A, 11B are lenses for realizing a zoom function and movable in optical axis directions by zoom lens drive units 18A, 18B, each including a motor and a motor driver. Zoom lens drive units 18A, 18B control the movement of zoom lens 11A, 11B based on zoom data obtained by CPU 33 when a zoom lever included in input unit 34 is operated.

The aperture diameter of each of apertures 12A, 12B is controlled by a not shown aperture drive unit based on the aperture data obtained by AE processing performed by imaging control unit 22.

Each of shutters 13A, 13B is a mechanical shutter and driven by a not shown shutter drive unit according to the shutter speed obtained by the AE processing.

Each of CCDs 14A, 14B includes a photoelectric surface having multitudes of light receiving elements disposed two-dimensionally, and a light image representing a subject is formed on the photoelectric surface and subjected to photo-electric conversion, whereby an analog image signal is obtained. A color filter having R, G, and B filters disposed regularly is provided in front of each of CCDs 14A, 14B.

AFEs 15A, 15B perform processing on the analog image signals outputted from CCDs 14A, 14B respectively for removing noise and adjusting gain (analog processing).

A/D conversion units 16A, 16B convert the analog image signals analog-processed by AFEs 15A, 15B to digital signals respectively. Note that an image represented by digital image data obtained by imaging unit 21A is hereinafter called as a first image G1, and an image represented by digital image data obtained by imaging unit 21B is called as a second image G2.

Imaging control unit 22 includes a not shown AF processing unit and a not shown AE processing unit. The AF processing unit determines a focusing area based on pre-images obtained by imaging units 21A, 21B when a lease button included in input unit 34 is depressed halfway, determines focus positions of lenses 10A, 10B, and outputs the determined results to imaging units 21A, 21B. The AE processing unit calculates brightness of the pre-images as a luminance evaluation value, determines the aperture value and shutter speed based on the luminance evaluation value, and outputs the determination results to imaging units 21A, 21B.

Here, as for the detection method of the focus position by the AF processing, a passive system that detects the focus position by making use of the fact that the contrast of the image becomes high when a desired subject is brought into focus is conceivable. More specifically, a pre-image is divided into a plurality of AF areas, then filtering processing is performed on the image in each AF area using a high-pass filter, an AF evaluation value, which is an evaluation value of a high frequency component, is calculated for each AF area, and an AF area having a highest evaluation value, i.e., a highest filter output value is detected as the focusing area.

Further, when the release button is fully depressed, imaging control unit 22 instructs imaging units 21A, 21B to perform main imaging for obtaining first and second images G1, G2 respectively. Before the release button is depressed, imaging control unit 22 instructs imaging unit 21A to obtain a through-the-lens image having less number of pixels than that of the main image at a predetermined time interval (e.g., at an interval of 1/30 seconds).

Image processing unit 23 performs image processing, such as white balance adjustment, tone correction, sharpness correction, color correction, and the like, on digital image data of first and second images G1 and G2 obtained by imaging units 21A, 21B respectively. Note that reference symbols G1, G2 used for the first and second images before subjected to the processing of image processing unit 23 will also be used for the processed first and second images.

Compression/expansion unit 24 performs compression, for example, in JPEG compression format or the like on image data representing a three-dimensional display image generated, for a three-dimensional display, from the main images of first and second images G1, G2 processed by image processing unit 23 as described later to generate a three-dimensional image file for a three-dimensional display. The three-dimensional image file includes imaged data of the first and second images G1, G2 and image data of the three-dimensional display image. Further, the image file includes a tag attached thereto having auxiliary information, such as date and time of imaging and the like, stored therein in Exif format or the like.

Frame memory 25 is a work memory used when various types of processing, including the processing of image processing unit 23, are performed on the image data representing the first and second images G1, G2 obtained by imaging units 21A, 21B.

Medium control unit 26 gains access to recording medium 29 and controls read/write operations for the three-dimensional image file and the like.

Internal memory 27 includes the baseline length and convergence angle between imaging units 21A, 21B, various types of constants to be set in compound eye camera 1, programs to be executed by CPU 33, and the like. Internal memory 27 also includes position information of a reference area for disposing a menu in a first image G1 and information of a parallax D0 to be given to the menu when the menu is three-dimensionally displayed, as described later. Note that the parallax D0 is set to a predetermined value in advance.

Display control unit 28 causes first and second images G1, G2 stored in frame memory 25 when captured or first and second images G1, G2 stored in recording medium 29 to be two-dimensionally displayed on monitor 20. Further, display control unit 28 is capable of causing three-dimensional processed first and second images G1, G2, as described later, to be three-dimensionally displayed on monitor 20 and causing a three-dimensional image stored in recording medium 29 to be three-dimensionally displayed on monitor 20. The switching between the two-dimensional display and three-dimensional display may be implemented automatically or based on an instruction from the photographer through input unit 34, to be described later. When the three-dimensional display is performed, through-the-lens images of first and second images G1, G2 are three-dimensionally displayed on monitor 20 until the release button is depressed.

When the display mode is switched to the three-dimensional display, both first and second images G1, G2 are used for the display and when the display mode is switched to the two-dimensional display, either one of the first and second images G1, G2 is used for the display, as described later. In the present embodiment, it is assumed that the first image G1 is used for the two-dimensional display.

Further, compound eye camera 1 according to the present embodiment includes three-dimensional processing unit 30. Three-dimensional processing unit 30 performs three-dimensional processing on first and second images G1, G2 so as to be three-dimensionally displayed on monitor 20. As for the three-dimensional display in the present embodiment, any known method may be used. For example, a method that realizes stereo vision through naked eye parallel viewing in which first and second images G1, G2 are displayed side by side or a lenticular system that realizes three-dimensional display by applying lenticular lenses to monitor 20 and displaying first and second images G1, G2 at predetermined positions of the display surface of monitor 20, thereby causing the first and second images G1, G2 to be incident on the left and right eyes respectively may be used. Further, a scan backlight method that realizes three-dimensional display by alternately separating the optical path of the backlight of monitor 20 so as to optically correspond to the left and right eyes respectively and displaying first and second images G1, G2 on the display surface of monitor 20 according to the separation of the backlight in left-right directions may also be used.

Note that monitor 20 has been processed according to three-dimensional processing performed by three-dimensional processing unit 30. For example, if the three-dimensional display is a lenticular system, lenticular lenses are applied to the display surface of monitor 20, while if it is a scan backlight method, an optical element for changing the light beam directions of the left an right images is applied to the display surface of monitor 20.

Three-dimensional processing unit 30 performs three-dimensional processing for three-dimensionally displaying, on monitor 20, a menu for giving various instructions to compound eye camera 1. FIG. 3 illustrates three-dimensional processing performed on the menu. Note that the contents of first and second images G1, G2 are omitted for clarity in FIG. 3. As illustrated in FIG. 3, three-dimensional processing unit 30 performs the three-dimensional processing by superimposing menus M1 and M2 on the first and second images G1, G2 respectively such that the menus M1 and M2 have a parallax D0. This allows the first and second images G1, G2 and menus M1 and M2 to be displayed three-dimensionally. Here, the parallax D0 is set to a predetermined value so that the menu has a predetermined stereoscopic appearance, but it is changed according to stereoscopic appearances of the areas of the first and second images G1, G2 where menus M1, M2 are displayed. The processing for changing the parallax value will be described later.

Further, compound eye camera 1 according to the present embodiment includes distance information calculation unit 31. Distance information calculation unit 31 obtains a corresponding point in the second image G2 with respect to each pixel in a reference area B1 of the first image G1 where the menu M1 is disposed, and calculates the parallax between corresponding points as distance information of each pixel. FIG. 4 illustrates the parallax calculation. As illustrated in FIG. 4, when a coordinate system is set with the origin at the bottom left corner, the reference area B1 is located in the range from x0 to x1 in the x direction. Distance information calculation unit 31 obtains a corresponding point with respect to each pixel in the reference area B1 by performing block matching on a search area S0 set in the second image G2.

Here, if a maximum allowable value of the parallax and a minimum allowable value of the parallax are assumed to be Rmax and Rmin respectively, the range of the search area S0 in the x direction is from x0-Rmax to x1-Rmin in the second image G2. In FIG. 4, the minimum allowable value of the parallax is set to zero.

Here, as the positions of imaging units 21A, 21B in the vertical direction are the same, distance information calculation unit 31 performs the block matching by setting a block of a predetermined size centered on each pixel in the reference area B1, calculating a correlation value by shifting the block in the search area S0 only in the x direction by the allowable parallax value, obtaining a pixel in the search area S0 having a maximum correlation value as the corresponding point of the target pixel.

The correlation may be calculated by Formula (1) below. In Formula (1), d is an allowable parallax, and Formula (1) obtains a correlation value SAD by performing block matching based on the absolute difference value calculation using a block of a size of w×w centered on a pixel (x, y) in each of the reference area B1 and search area S0 while changing the parallax d in the range from Rmin to Rmax. When Formula (1) is used, the value of d that makes the correlation value SAD minimum is the parallax of the pixel (x, y).

Here, a correlation value SSD based on square of difference may be calculated by Formula (2) below. When Formula (2) is used, the value of d that makes the correlation value SSD minimum is the parallax of the pixel (x, y). Further, a correlation value COR may be calculated by Formula (3) below. When the correlation value COR is calculated by Formula (3), the value of d that makes the correlation value COR maximum is the parallax of the pixel (x, y).

$$SAD(x, y, d) = \sum_{-w/2 < x' < w/2} \sum_{-w/2 < y' < w/2} |G1(x+x', y+y') - G2(x+x'-d, y+y')| \quad (1)$$

$$SSD(x, y, d) = \sum_{-w/2 < x' < w/2} \sum_{-w/2 < y' < w/2} (G1(x+x', y+y') - G2(x+x'-d, y+y'))^2 \quad (2)$$

$$COR(x, y, d) = \frac{\sum_{-w/2 < x' < w/2} \sum_{-w/2 < y' < w/2} (G1(x+x', y+y') - \overline{G1})(G2(x+x'-d, y+y') - \overline{G2})}{\sqrt{\sum\sum (G1(x+x', y+y') - \overline{G1})^2} \sqrt{\sum\sum (G2(x+x'-d, y+y') - \overline{G2})^2}} \quad (3)$$

where, $$\overline{G1} = \frac{\sum_{-w/2 < x' < w/2} \sum_{-w/2 < y' < w/2} G1(x+x', y+y')}{(w-1)^2}$$

$$\overline{G2} = \frac{\sum_{-w/2 < x' < w/2} \sum_{-w/2 < y' < w/2} G2(x+x'-d, y+y')}{(w-1)^2}$$

Here, if each of the first and second images G1, G2 is an image that includes two persons P1, P2 located in front and back positions with a mountain as the background as shown in FIG. 5, the positional relationship in the depth direction (i.e., z direction) among the mountain, person P1, and person P2 when the first and second images G1, G2 are three-dimensionally displayed, the person P2 comes in the front and person P1 is between the background mountain and person P2, as shown in FIG. 6. In FIG. 6 and in the subsequent description, the origin of the z direction in a three-dimensional space when three-dimensional display is performed is assumed to be, for example, the position of the imaging surface of each of CCDs 14A, 14B.

When menus M1, M2 are superimposed on the first and second images G1, G2, as illustrated in FIG. 3 and displayed three-dimensionally, and if the parallax D0 between the menus M1, M2 is set such that a three-dimensionally displayed menu is displayed at a position of z0 in the depth direction, the stereoscopic viewing of the image will result in that the menu comes between the persons P1, P2, as illustrated in FIG. 7. In this case, if the menu M0 has a semitransparent or transparent background or if the menu M0 is formed of only characters (having a pixel value only in the font of characters and in no other areas), in particular, the image appears very unnatural in which, even though the menu M appears in the back of the person P2 located in front, the menu M0 is viewed through the person P2.

Here, distance information calculation unit 31 is a unit that calculates the parallax at each pixel in the reference area B1 as the distance information, as described above. Consequently, when the menu M1 is disposed in the reference area B1 of the first image G1 as shown in FIG. 8, the use of the calculated parallaxes allows a parallax distribution, i.e., a distance distribution in the reference area B1 to be obtained, as illustrated in FIG. 9. In FIG. 9, the background mountain is on the back side and the stereoscopic appearance is enhanced in the order of person P1 and person P2. FIG. 9 illustrates a distance distribution on a certain x-z plane orthogonal to the y-axis.

Consequently, three-dimensional processing unit 30 obtains the distance distribution of pixels in the reference area B1 based on the distance information calculated by distance information calculation unit 31 and performs three-dimensional processing on the menus M1, M2 so as to have a greater parallax than the parallax calculated for a pixel having a greatest stereoscopic appearance in the distance distribution. Where the distance distribution obtained is like that shown in FIG. 9, the pixel having the greatest stereoscopic appearance is a pixel corresponding to the point O1 in the person P2. Here, the parallax at the point O1 is the greatest of all parallaxes calculated with respect to each pixel in the reference area B1. Therefore, when the parallax at the point O1 is assumed to be the maximum parallax Dmax, three-dimensional processing unit 30 performs three-dimensional processing in which the menus M1, M2 are superimposed on the first and second images G1, G2 respectively so as to have a parallax Db which is greater than the maximum parallax Dmax corresponding to the point O1, as illustrated in FIG. 10. The parallax Db is calculated by adding a predetermined value to the maximum parallax Dmax. Further, the Db may be set as Db=Dmax. By performing the three-dimensional processing on the menus M1, M2 in the manner described above, the menu M0 can be stereoscopically viewed in front of the position z0 in the depth direction or at the position z1 in front of the person P2 appearing in the forefront when first and second images G1, G2 and menus M1, M2 are three-dimensionally displayed as illustrated in FIG. 11.

In the three-dimensional display, it is also possible to make the menu M0 stereoscopically viewable in front of the person P2 by changing not only the parallax between the menus M1, M2 but also the parallax between the first and second images G1, G2. Here, if the parallax between the first and second images G1, G2 is reduced, the stereoscopic appearance of the three-dimensional image is also reduced. Thus, it is possible to perform the three-dimensional processing in which, while the predetermined parallax D0 between the menus M1, M2 remains unchanged, the overall parallax between the first and second images G1, G2 is reduced such that the maximum parallax Dmax of the pixel corresponding to the point O1 in the person P2 becomes smaller than D0 by a predetermined value. This allows the person P2 to be made three-dimensionally viewable on the back side of the position z0 where the menu M0 is displayed in the three-dimensional display, as illustrated in FIG. 12. The three-dimensional processing for reducing the parallax may be implemented by shifting the positions of the first and second images G1, G2 in the horizontal directions or by processing the first and second images G1, G2 by morphing.

It is also possible to cause the person P2 to be stereoscopically viewable on the back side of the menu M0 in three-dimensional display by changing both the parallax between the menus M1, M2 and the parallax between the first and second images G1, G2.

CPU 33 controls each unit of compound eye camera 1 according to a signal from input unit 34 which includes the release button and the like.

Data bus 35 is connected to each unit of compound eye camera 1 and CPU 33, and various types of data and information in compound eye camera 1 are exchanged through the bus.

When imaging a subject, the subject distance may always be changed since the subject may move or compound eye camera 1 may be moved to change the imaging position. Consequently, in the present embodiment, processing for changing the stereoscopic appearance of the menu M0 is performed at a predetermined time interval. For this purpose, timer 36 is connected to CPU 33.

Processing performed in the first embodiment will now be described. FIG. 13 is a flowchart illustrating the processing performed in the first embodiment. Here, it is assumed that three-dimensional processing is performed on first and second images G1, G2 obtained by imaging units 21A, 21B respectively by three-dimensional processing unit 30 and a through-the-lens image of the first and second images is three-dimensionally displayed on monitor 20 of compound eye camera 1. Further, as the present invention has characteristic features in the processing for displaying a menu, only the processing when an instruction to display the menu is given while the through-the-lens image is displayed will be described hereinafter.

CPU 33 keeps monitoring whether or not an instruction to display the menu has been issued by the photographer (step ST1) and, if step ST1 is positive, obtains information of reference area B1 of the first image G1 where the menu M1 is displayed and current parallax Dr (step ST2). Note that the initial value of the current parallax Dr is D0. Then, distance information calculation unit 31 sets the reference area B1 in the first image G1 (step ST3) and calculates a parallax of each pixel in the reference area B1 as distance information (step ST4).

Following this, three-dimensional processing unit 30 obtains a maximum parallax Dmax corresponding to the parallax of a portion having the greatest stereoscopic appearance among the calculated parallaxes of distance information (step ST5) and determines whether or not the maximum parallax Dmax is greater than the current parallax Dr between the menus M1, M2 (step ST6). If step ST6 is positive, three-dimensional processing unit 30 changes the current parallax Dr between the menus M1, M2 to a parallax Db which is greater than the maximum parallax Dmax (step ST7), disposes the menus M1, M2 in the first and second images G1, G2 respectively so as to have the parallax Db (step ST8), and performs three-dimensional processing on the first and second images G1, G2 and the menus M1, M2 (step ST9). Then, display control unit 28 causes a three-dimensional image with a menu M0 superimposed thereon to be three-dimensionally displayed on monitor 20 (step ST10). In the mean time, if step ST6 is negative, the processing proceeds to step ST8 and the menus M1, M2 are disposed in the first and second images G1, G2 respectively so as to have the current parallax Dr and the three-dimensional processing is performed.

Following this, CPU causes timer 36 to start counting and starts monitoring for the elapse of a predetermined time from the three-dimensional display (step ST11). If step ST11 is positive, the processing returns to step ST2 and repeats the steps from step ST2 onward.

As described above, in the first embodiment, distance information is calculated for each pixel in the reference area B1, and the relative position of the menu M0 with respect to a three-dimensional image, which is based on the first and second images G1, G2, in a depth direction in the three-dimensional space is changed such that the menu M0 is displayed at a position on the front side of the three-dimensional image based on the distance information in the reference area B1. This allows the menu M0 to be three-dimensionally displayed on the front side of the three-dimensional image without overlapping with the image on top of each other.

Further, calculation of distance information and three-dimensional processing of the first and second images G1, G2 and the menus M1, M2 are performed at a predetermined time interval, so that the menu M0 may be three-dimensionally displayed without overlapping with the three-dimensional image on top of each other even when the subject under imaging has moved or the imaging position has been changed while the menu is displayed and selection of a menu item is performed, and hence the stereoscopic appearance of the three-dimensional image to be displayed three-dimensionally has changed.

Here, objects other than the menu, such as an icon indicating flash emission and characters indicating the number of images taken so far, F number and shutter speed, and imaging date are always displayed at the time of imaging, as illustrated in FIG. 14. Such objects may also be displayed three-dimensionally by performing the three-dimensional processing. In the present embodiment, calculation of distance information and three-dimensional processing of a plurality of images and objects are performed at a predetermined time interval so that the objects may be three-dimensionally displayed without overlapping with the three-dimensional image on top of each other even when the subject under imaging has moved or the imaging position has been changed and hence the stereoscopic appearance of the three-dimensional image to be displayed three-dimensionally has changed.

In the first embodiment described above, the parallax is calculated with respect to all of the pixels in the reference area B1, but an arrangement may be adopted in which a characteristic portion of the image in the reference area B1 is extracted and the parallax is calculated with respect only to pixels corresponding to the characteristic portion. Here, as for the characteristic portion, a particular subject included in the image, such as an edge, a predetermined face, or the like, may be used.

FIG. 15 illustrates the state in which edges are extracted from the reference area B1 and FIG. 16 illustrates the state in which faces are extracted from the reference area B1. Note that the edges extracted from the reference area B1 are indicated by a heavy line in FIG. 15. As shown in FIG. 15, the number of pixels corresponding to the edges in the reference area B1 is less than the number of all of the pixels in the reference area B1. Likewise, the number of pixels of face portions enclosed by the rectangles is less than the number of all of the pixels in the reference area B1. Therefore, the amount of calculation may be reduced by extracting a characteristic portion of the image in the reference area B1 and calculating the parallax with respect only to pixels corresponding to the characteristic portion, whereby the processing speed may be increased.

It is often the case that the particular subject, such as an edge, a face, or the like is included in a main subject of the image and is located at a position closest to the camera at the time of imaging. Consequently, the pixel having the greatest stereoscopic appearance in the reference area B1 may be obtained by calculating parallaxes in the characteristic portion.

Consequently, the menu M0 may be three-dimensionally displayed on the front side of the three-dimensional image without overlapping with the three-dimensional image on top of each other by performing the three-dimensional processing on the menus M1, M2 so as to have the parallax Dr which is greater than the maximum parallax Dmax of the pixel having the greatest stereoscopic appearance in the reference area B1.

In the mean time, distances on the front and back side of the depth of field may be calculated by Formulae (4) and (5) based on the focal length, aperture value, focus position, and permissible circle of confusion of imaging units 21A, 21B when first and second images G1, G2 are obtained. The focal length, aperture value, and focus position may be obtained from setting values of focus lens drive units 17A, 17B, not shown aperture drive unit, and zoom lens drive units 18A, 18B at the time of imaging. Further, the permissible circle of confusion stored in internal memory 27 in advance may be obtained from the specifications of CCDs 14A, 14B.

$$L_{near} = L - \frac{\delta \cdot F \cdot L^2}{f^2 + \delta \cdot F \cdot L} \quad (4)$$

$$L_{far} = L + \frac{\delta \cdot F \cdot L^2}{f^2 - \delta \cdot F \cdot L} \quad (5)$$

where, Lnear is a distance on the front side of the depth of field, Lfar is the distance on the back side of the depth of field, f is the focal length, F is the aperture value, L is the focus position, and δ is the permissible circle of confusion diameter.

This shows that the subject in the reference area B1 is in the range of the calculated distances on the front and back side of the depth of field. Therefore, the parallax Dmax at the pixel having the greatest stereoscopic appearance included in the reference area B1 may be calculated by Formula (6) below from the distance Lmin on the front side of the depth of field. Consequently, the menu M0 may be three-dimensionally displayed on the front side of the three-dimensional image without overlapping with the three-dimensional image on top of each other by performing the three-dimensional processing on the menus M1, M2 so as to have a parallax which is greater than the parallax Dmax.

Parallax $D$max=Baseline Length $K$×Focal Distance $f$/Distance $L$min  (6)

Next, a second embodiment of the present invention will be described. The configuration of a compound eye camera to which the three-dimensional display apparatus of the second embodiment is applied is identical to that of the compound eye camera to which the three-dimensional display apparatus of the first embodiment is applied and differs only in the processing performed. Therefore, the configuration will not be elaborated upon further here. The second embodiment differs from the first embodiment in that, whereas calculation of distance information and three-dimensional processing of a plurality of images and objects are performed at a predetermined time interval in the first embodiment, they are performed when the optical systems of imaging units 21A, 21B, i.e., focus lenses 10A, 10B and zoom lenses 11A, 11B are driven in the second embodiment.

Next, processing performed in the second embodiment will be described. FIG. 17 is a flowchart illustrating the processing performed in the second embodiment. CPU 33 keeps monitoring whether or not an instruction to display the menu has been issued by the photographer (step ST21) and, if step ST21 is positive, obtains information of reference area B1 of the first image G1 where the menu M1 is displayed and current parallax Dr (step ST22). Note that the initial value of the current parallax Dr is D0. Then, distance information calculation unit 31 sets the reference area B1 in the first image G1 (step ST23) and calculates a parallax of each pixel in the reference area B1 as distance information (step ST24).

Following this, three-dimensional processing unit 30 obtains a maximum parallax Dmax corresponding to the parallax of a portion having the greatest stereoscopic appearance among the calculated parallaxes of distance information (step ST25) and determines whether or not the maximum parallax Dmax is greater than the current parallax Dr between the menus M1, M2 (step ST26). If step ST26 is positive, three-dimensional processing unit 30 changes the current parallax Dr between the menus M1, M2 to a parallax Db which is greater than the maximum parallax Dmax (step ST27), disposes the menus M1, M2 in the first and second images G1, G2 respectively so as to have the parallax Db (step ST28), and performs three-dimensional processing on the first and second images G1, G2 and the menus M1, M2 (step ST29). Then, display control unit 28 causes a three-dimensional image with a menu M0 superimposed thereon to be three-dimensionally displayed on monitor 20 (step ST30). In the mean time, if step ST26 is negative, the processing proceeds to step ST28 and the menus M1, M2 are disposed in the first and second images G1, G2 respectively so as to have the current parallax Dr and the three-dimensional processing is performed.

Following this, CPU 33 starts monitoring whether or not the optical systems of imaging units 21A, 21B have been driven (step ST31). If step ST31 is positive, the processing returns to step ST22 and repeats the steps from step ST22 onward.

As described above, in the second embodiment, calculation of distance information and three-dimensional processing of first and second images G1, G2, and menus M1, M2 are performed when the optical systems of imaging units 21A, 21B, i.e., focus lenses 10A, 10B and zoom lenses 11A, 11B, are driven. Even when the stereoscopic appearance of three-dimensionally displayed three-dimensional image has changed by changing the zoom position and focus position of imaging units 21A, 21B, this allows the menu M0 to be three-dimensionally displayed without overlapping with the image on top of each other.

Next, a third embodiment of the present invention will be described. The configuration of a compound eye camera to which the three-dimensional display apparatus of the third embodiment is applied is identical to that of the compound eye camera to which the three-dimensional display apparatus of the first embodiment is applied and differs only in the processing performed. Therefore, the configuration will not be elaborated upon further here. The third embodiment differs from the first embodiment in that, whereas calculation of distance information and three-dimensional processing of a plurality of images and objects are performed at a predetermined time interval in the first embodiment, in the third embodiment, imaging control unit 22 calculates a luminance evaluation value and an AF evaluation value every time through-the-lens images of first and second images G1, G2 are obtained, and calculation of distance information and three-dimensional processing of the first and second images G1, G2 and menus M1, M2 are performed when at least one of the evaluation value and AF evaluation value has changed.

Next, processing performed in the third embodiment will be described. FIG. 18 is a flowchart illustrating the processing performed in the third embodiment. CPU 33 keeps monitoring whether or not an instruction to display the menu has been issued by the photographer (step ST41) and, if step ST41 is positive, imaging control unit 22 calculates a luminance value and an AF evaluation value from the currently captured through-the-lens images of the first and second images G1, G2 (Evaluation Value Calculation, step ST42). Then, CPU 33 obtains information of reference area B1 of the first image G1 where the menu M1 is displayed and current parallax Dr (step ST43). Note that the initial value of the current parallax Dr is D0. Then, distance information calculation unit 31 sets the reference area B1 in the first image G1 (step ST44) and calculates a parallax of each pixel in the reference area B1 as distance information (step ST45).

Following this, three-dimensional processing unit 30 obtains a maximum parallax Dmax corresponding to the parallax of a portion having the greatest stereoscopic appearance among the calculated parallaxes of distance information (step ST46) and determines whether or not the maximum parallax Dmax is greater than the current parallax Dr between the menus M1, M2 (step ST47). If step ST47 is positive, three-dimensional processing unit 30 changes the current parallax Dr between the menus M1, M2 to a parallax Db which is greater than the maximum parallax Dmax (step ST48), disposes the menus M1, M2 in the first and second images G1, G2 respectively so as to have the parallax Db (step ST49), and performs three-dimensional processing on the first and second images G1, G2 and the menus M1, M2 (step ST50). Then, display control unit 28 causes a three-dimensional image with a menu M0 superimposed thereon to be three-dimensionally displayed on monitor 20 (step ST51). In the mean time, if step ST47 is negative, the processing proceeds to step ST49 and the menus M1, M2 are disposed in the first and second images G1, G2 respectively so as to have the current parallax Dr and the three-dimensional processing is performed.

Following this, imaging control unit 22 calculates a luminance evaluation value and an AF evaluation value from the currently captured through-the-lens images of the first and second images G1, G2 (Evaluation Value Calculation, step ST52), and CPU 33 determines whether or not at least one of the luminance evaluation value and AF evaluation value has changed by an amount exceeding a predetermined threshold value (step ST53). If step ST53 is negative, the processing returns to step ST52, while if step ST53 is positive, the processing returns to step ST43 and repeats the steps from step ST43 onward.

As described above, in the third embodiment, calculation of distance information and three-dimensional processing of first and second images G1, G2, and menus M1, M2 are performed when at least one of the luminance evaluation value and AF evaluation value has changed by an amount exceeding a predetermined threshold value. Even when the stereoscopic appearance of the three-dimensional image to be displayed three-dimensionally has changed due to a change in the brightness and/or focus position of the captured image, this allows the object to be displayed without overlapping with the three-dimensional image on top of each other.

In the third embodiment, at least one of a luminance evaluation value and an AF evaluation value is calculated as the evaluation value, but the other evaluation value, such as the image color or the like, may also be used as the evaluation value.

In the first to third embodiments, three-dimensional processing is performed on menus M1, M2 so as to have a parallax Db which is greater than a maximum parallax Dmax of the pixel having the greatest stereoscopic appearance in the reference area B1. But three-dimensional processing may be performed on menus M1, M2 such that the position of the menu M0 in a two-dimensional direction orthogonal to a depth direction of the menu M0, without changing the stereoscopic appearance of the menu M0, which will be described as a fourth embodiment of the present invention. The configuration of a compound eye camera to which the three-dimensional display apparatus of the fourth embodiment is applied is identical to that of the compound eye camera to which the three-dimensional display apparatus of the first embodiment is applied and differs only in the processing performed. Therefore, the configuration will not be elaborated upon further here.

In the fourth embodiment, distance information calculation unit 31 calculates a parallax at each pixel in the first image G1. FIG. 19 illustrates a distance distribution in the three-dimensional image calculated in the fourth embodiment. Note that FIG. 19 shows a distance distribution in a certain x-z plane orthogonal to y-axis. When menus M1, M2 are disposed at predetermined positions of first and second images G1, G2 with a predetermined parallax between them, if the stereoscopic appearance of a certain portion P0 of the three-dimensional image is greater than that of the menu M0, the portion P0 and menu M0 overlap on top of each other, as illustrated in FIG. 19. For this reason, three-dimensional processing unit 30 changes the disposing positions of menus M1, M2 such that the menu M0 is displayed at a portion of a less stereoscopic appearance than that of the menu M0 without changing the parallax in the fourth embodiment. For example, the disposing positions of the menus M1, M2 are changed such that the menu M0 is three-dimensionally displayed on the right side of the portion P0 as illustrated in FIG. 19.

By changing the disposing positions of the menus M1, M2 in the first and second images G1, G2 such that the menu M0 is displayed at a position where the menu M0 does not overlap with the three-dimensional image on top of each other in the manner as described above, the menu M0 may be displayed without overlapping with the three-dimensional image on top of each other, while stereoscopic appearances of the three-dimensional image and menu M0 remain unchanged.

In the first to fourth embodiments described above, compound eye camera 1 has two imaging units 21A, 21B and the three-dimensional display is performed using two images G1, G2, but the present invention may be applied to a case where three or more imaging units are provided and three-dimensional display is performed using three or more images.

Further, in the first to fourth embodiments described above, the three-dimensional display apparatus of the present invention is applied to compound eye camera 1, but a stand-alone three-dimensional display apparatus having display control unit 28, three-dimensional processing unit 30, display information calculation unit 31, and monitor 20 may be provided. In this case, a plurality of images obtained by imaging the same subject from a plurality of different positions is inputted to the stand-alone three-dimensional display apparatus, and a menu M0 is three-dimensionally displayed with an image, as in the first to fourth embodiments. In this case, the interface for inputting images to the apparatus corresponds to the image obtaining means.

So far, embodiments of the present invention have been described, but a program for causing a computer to function as the means corresponding to display control unit 28, three-dimensional processing unit 30, and distance information calculation unit 31, thereby causing the computer to perform processing like that shown in FIGS. 12, 17, and 18, is another embodiment of the present invention. Further, a computer readable recording medium on which is recorded such a program is still another embodiment of the present invention.

BRIEF DESCRIPTION OF THE DRAWINGS

FIG. 2 illustrates a configuration of imaging units 21A, 21B.

FIG. 3 illustrates three-dimensional processing performed on a menu (part 1).

FIG. 17 is a flowchart illustrating processing performed in a second embodiment.

FIG. 18 is a flowchart illustrating processing performed in a third embodiment.

FIG. 19 illustrates a distance distribution in a three-dimensional image calculated in a fourth embodiment.

DESCRIPTION OF REFERENCE SYMBOLS

Figure 1:
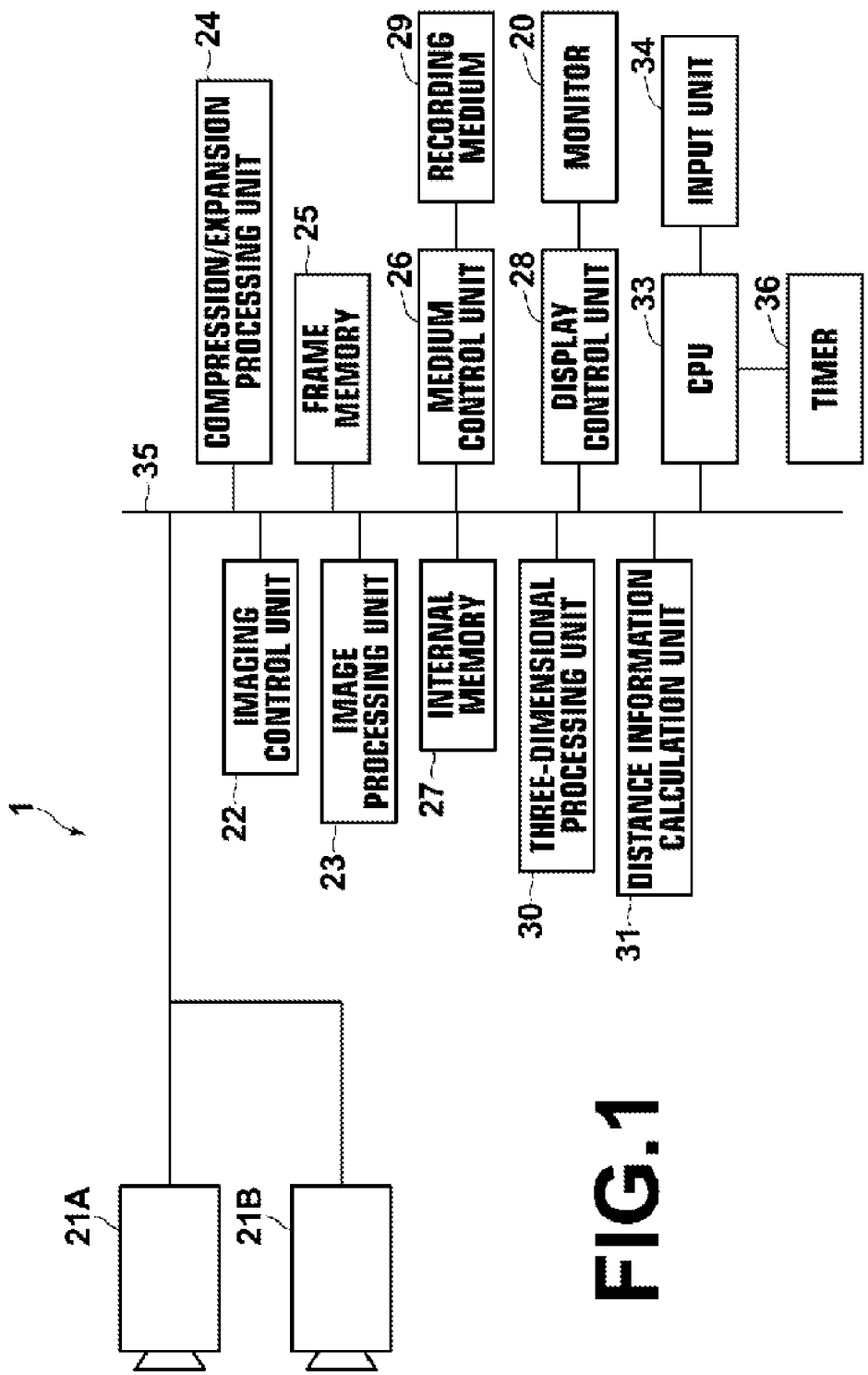
FIG. 1 is a schematic block diagram of a compound eye camera to which a three-dimensional display apparatus according to a first embodiment of the present invention is applied, illustrating an internal configuration thereof.
Figure 4:
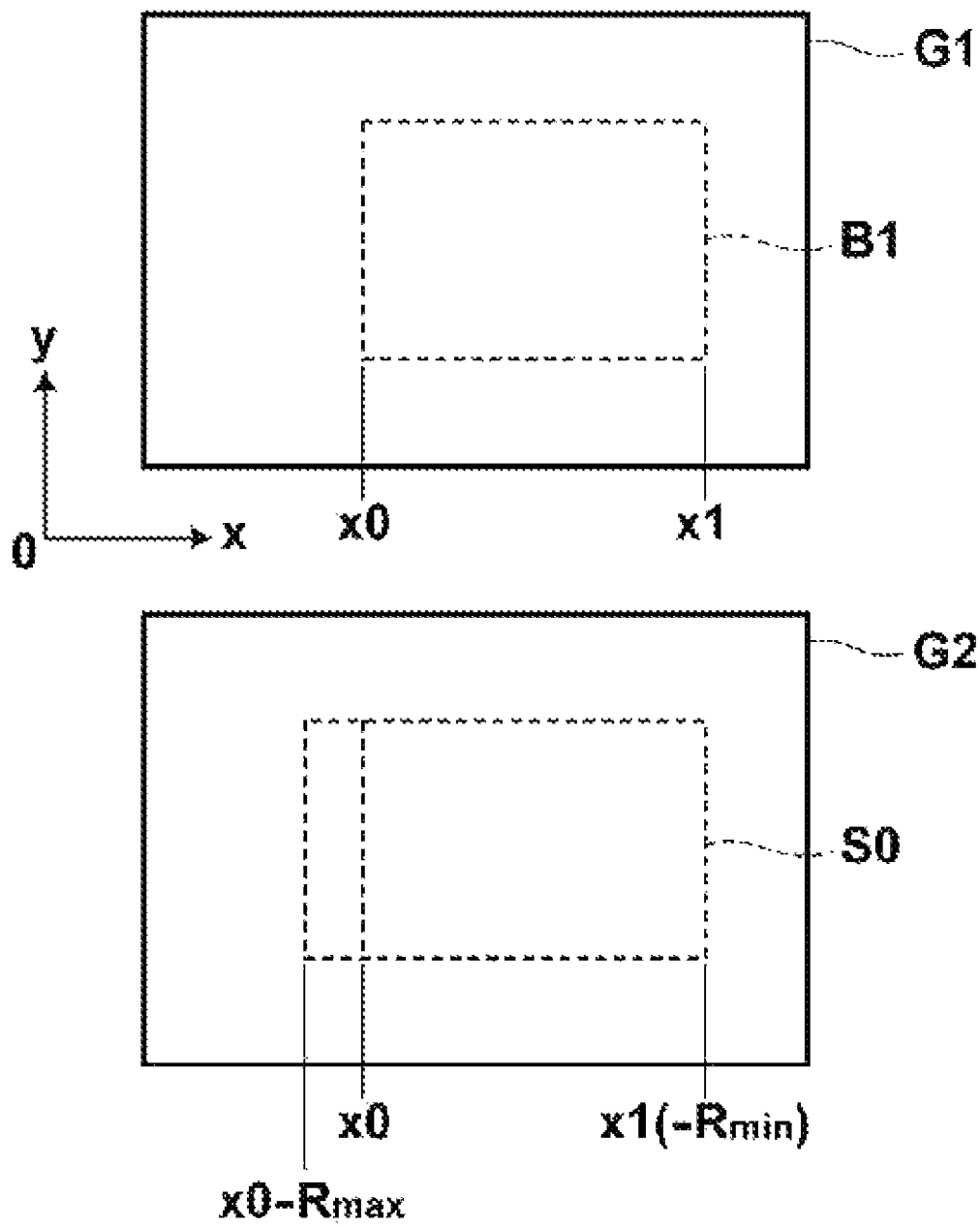
FIG. 4 illustrates a parallax calculation.
Figure 5:
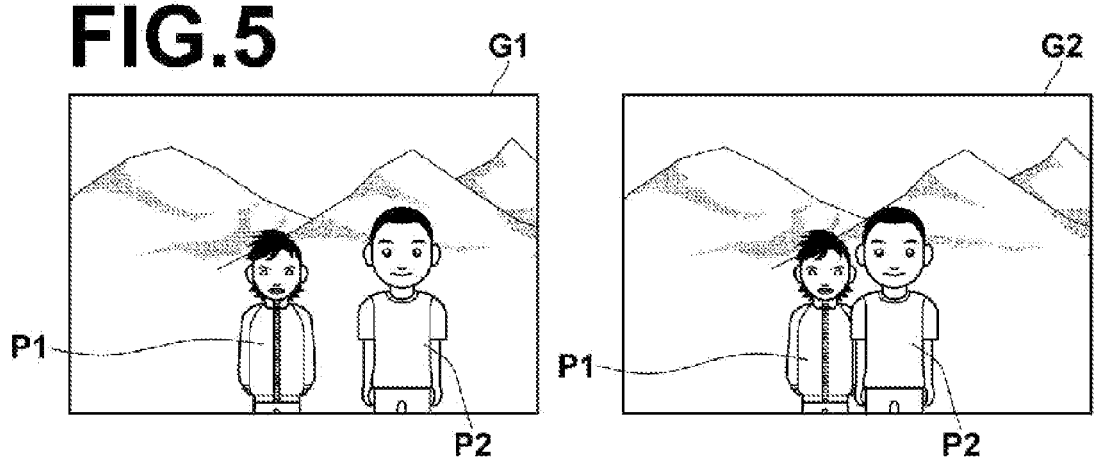
FIG. 5 illustrates examples of first and second images.
Figure 6:
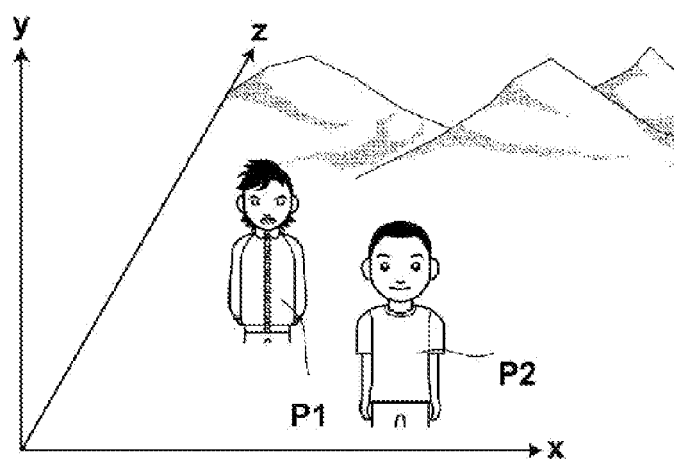
FIG. 6 illustrates a stereoscopic appearance of the images shown in FIG. 5.
Figure 7:
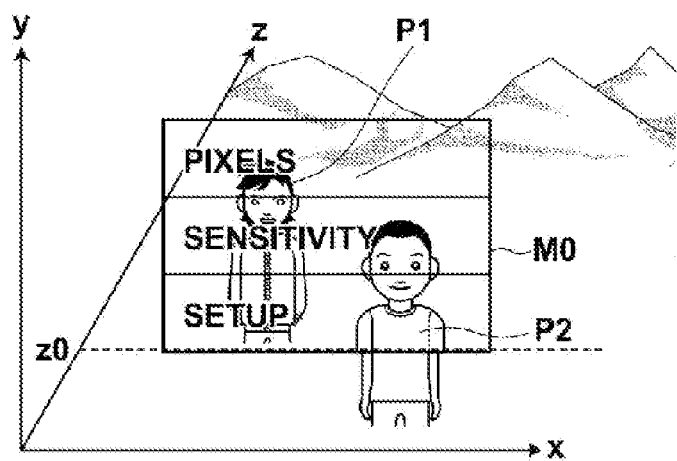
FIG. 7 illustrates a stereoscopic appearance of the images shown in FIG. 5 when a menu is displayed in the images.
Figure 8:
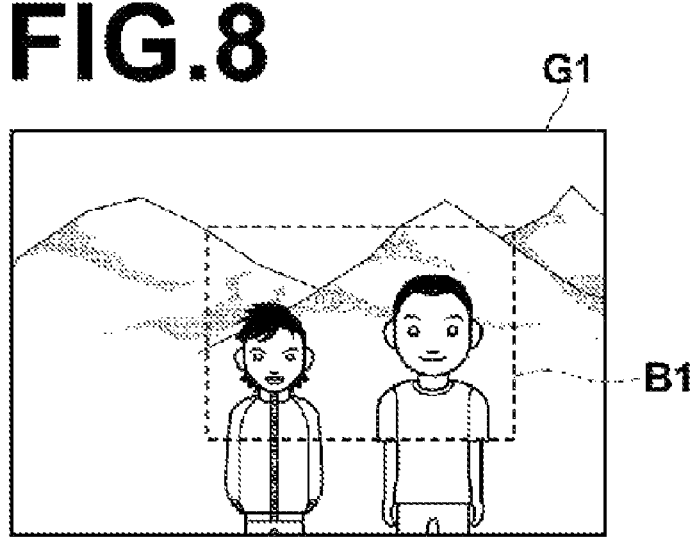
FIG. 8 illustrates a reference area.
Figure 9:
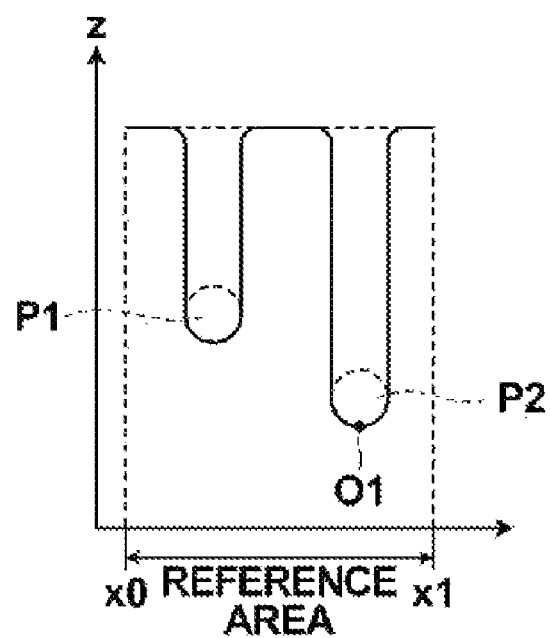
FIG. 9 illustrates a distance distribution in the reference area.
Figure 10:
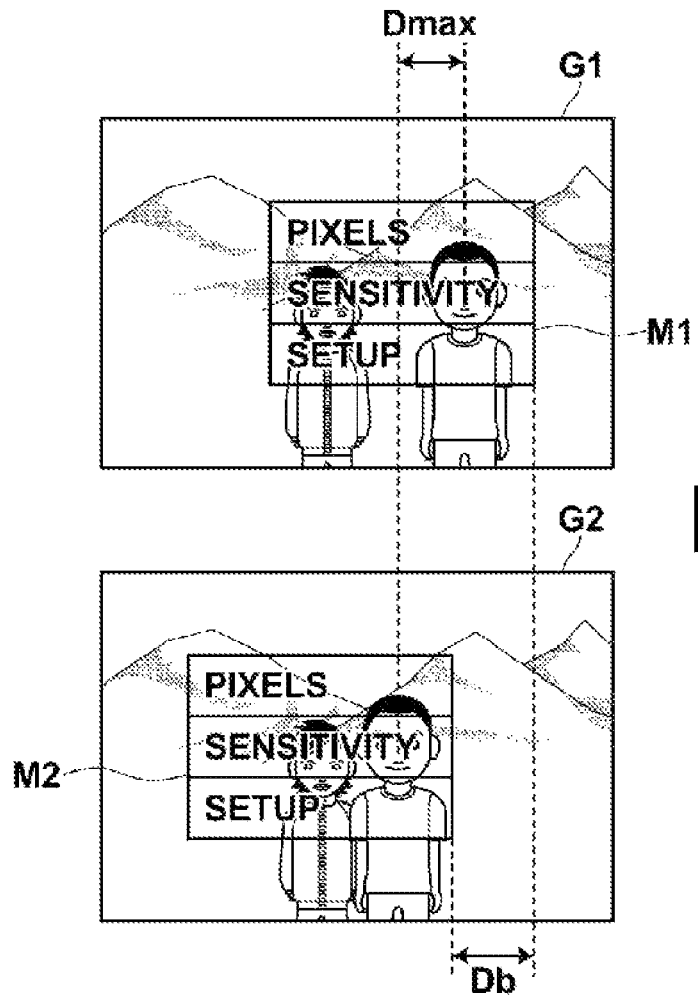
FIG. 10 illustrates three-dimensional processing performed on the menu (part 2).
Figure 11:
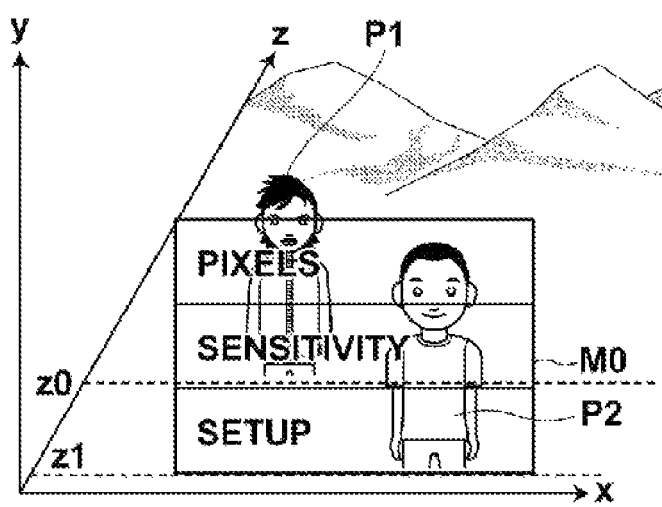
FIG. 11 illustrates three-dimensional processing through increasing of the parallax of the menu.
Figure 12:
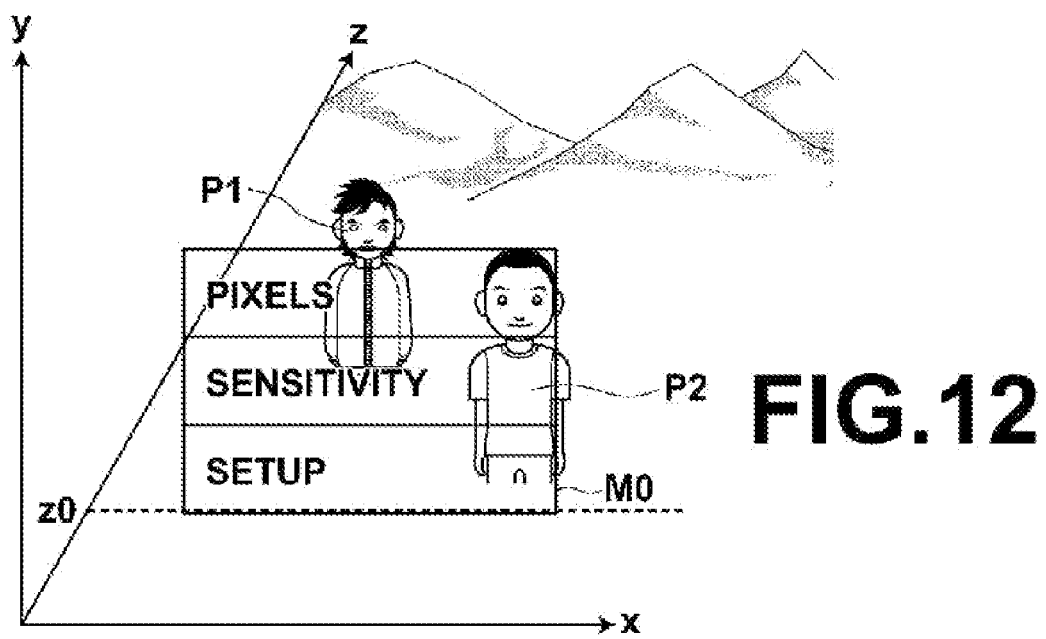
FIG. 12 illustrates three-dimensional processing through decreasing of the parallax of the first and second images.
Figure 13:
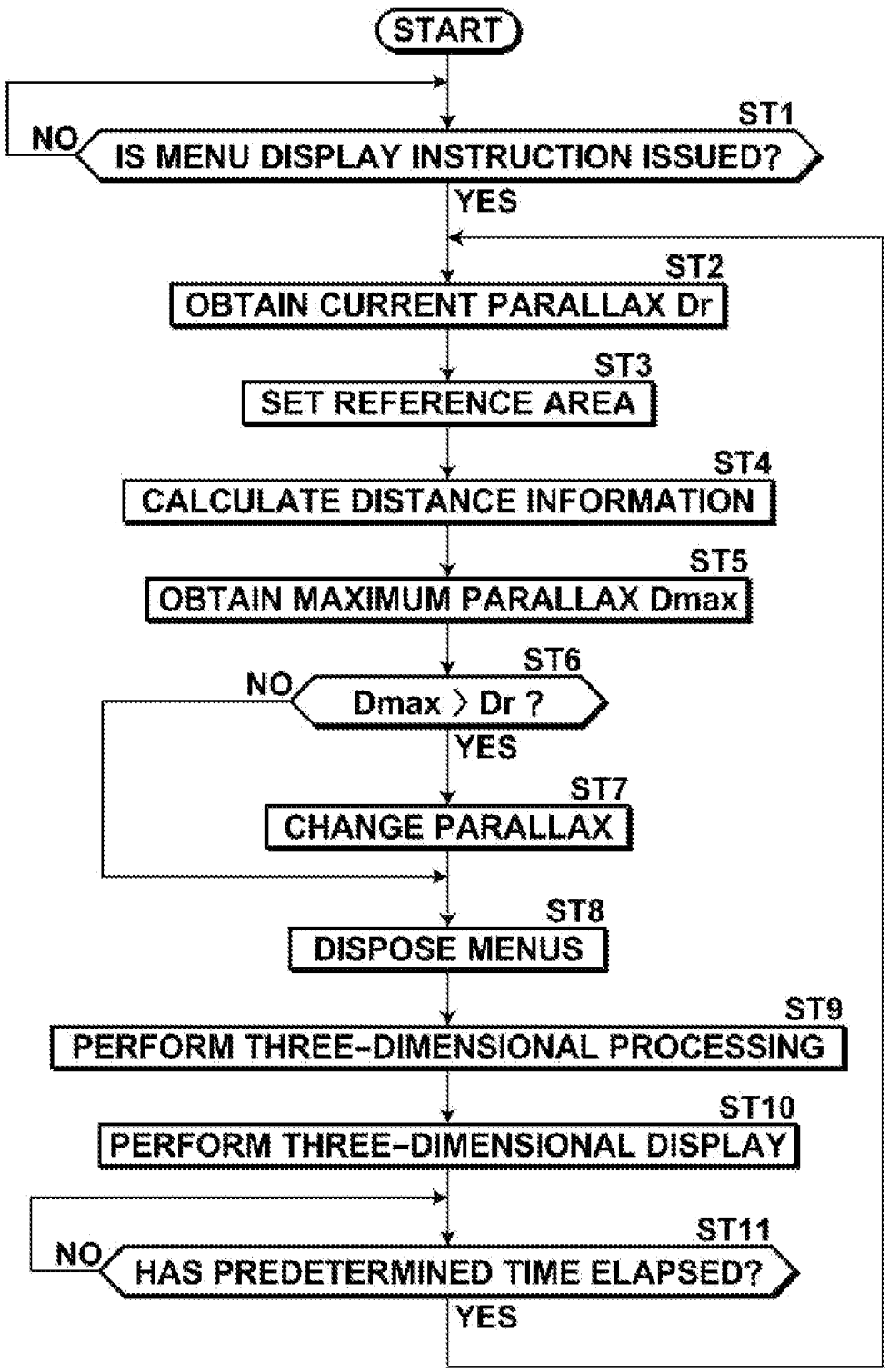
FIG. 13 is a flowchart illustrating processing performed in the first embodiment.
Figure 14:
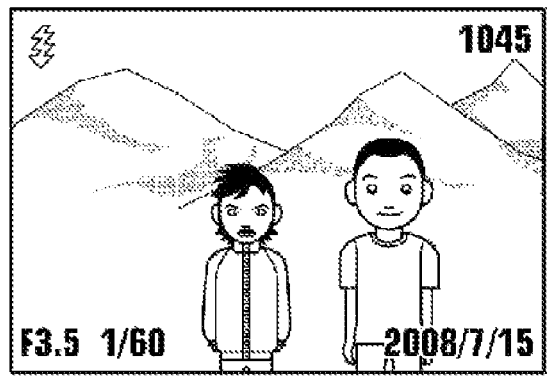
FIG. 14 illustrates a state in which objects are displayed.
Figure 15:
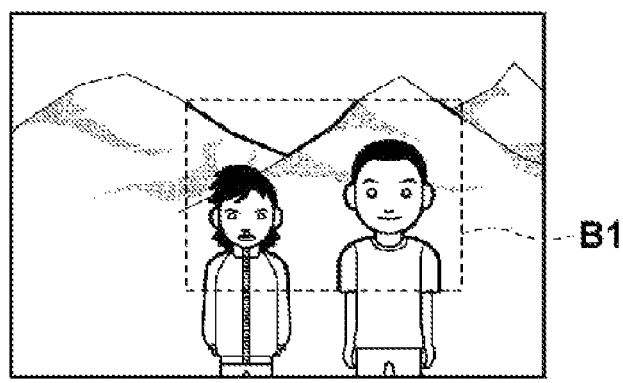
FIG. 15 illustrates a state in which edges are detected from the image in the reference area.
Figure 16:
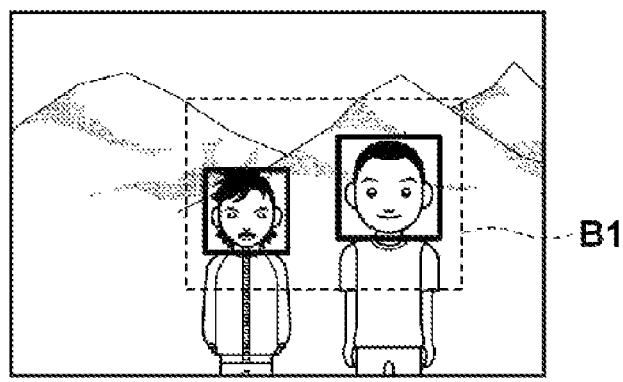
FIG. 16 illustrates a state in which face areas are detected from the image in the reference area.

1 Compound Eye Camera
21A, 21B Imaging Unit
22 Imaging Control Unit
28 Display Control Unit
30 Three-dimensional Processing Unit
31 Distance Information Calculation Unit

The invention claimed is:

1. A three-dimensional display apparatus, comprising:
a plurality of imaging units for obtaining a plurality of images having a parallax with respect to a subject viewed from different viewpoints by imaging the subject from different viewpoints;
a three-dimensional processing unit for performing three-dimensional processing for three-dimensional display on the plurality of images and performing the three-dimensional processing on an object to be displayed in the three-dimensionally displayed three-dimensional image in a superimposed manner;
a display unit for performing at least the three-dimensional display of the three-dimensional image;
a distance information calculation unit for calculating distance information of the three-dimensional image;
an imaging control unit for controlling the imaging units to image the subject at a predetermined time interval;
an evaluation value calculation unit for calculating an evaluation value which includes an evaluation value of at least one of a luminance and a high frequency component of the images obtained by the imaging units at the predetermined time interval; and
a control unit for controlling the distance information calculation unit and the three-dimensional processing unit to respectively perform the calculation of distance information and the three-dimensional processing on the plurality of images and the object when the evaluation value has changed by an amount exceeding a predetermined threshold value,
wherein the three-dimensional processing unit is a unit that changes a relative position of the object with respect to the three-dimensional image in a three-dimensional space based on the distance information such that overlapping of the object and the three-dimensional image on top of each other is prevented when the three-dimensional display is performed.

2. The three-dimensional display apparatus of claim 1, wherein:
the distance information calculation unit is a unit that calculates the distance information for each pixel in a reference area where the object is displayed in a reference image serving as a reference of the plurality of images; and
the three-dimensional processing unit is a unit that changes a relative position of the object in a depth direction with respect to the three-dimensional image in the three-dimensional space based on the distance information in the reference area such that the object is three-dimensionally displayed at a position on the front side of the three-dimensional image.

3. The three-dimensional display apparatus of claim 1, wherein the distance information calculation unit is a unit that calculates a parallax of corresponding points between each of the plurality of images as the distance information.

4. The three-dimensional display apparatus of claim 3, wherein the distance information calculation unit is a unit that extracts a characteristic portion of the plurality of images and calculates the parallax of corresponding points from the characteristic portion.

5. The three-dimensional display apparatus of claim 3, wherein the distance information calculation unit is a unit that calculates the parallax of corresponding points based on an imaging condition at the time of obtaining the plurality of images.

6. The three-dimensional display apparatus of claim 5, wherein the distance information calculation unit is a unit that calculates a distance on the front side of a depth of field from the imaging condition, and calculates a maximum parallax of the corresponding points from the front side distance, a baseline length, and a focal length at the time of the imaging.

7. The three-dimensional display apparatus of claim 3, wherein the three-dimensional processing unit is a unit that performs the three-dimensional processing on the object so as to have a parallax greater than or equal to a maximum parallax of the parallaxes of the corresponding points calculated in a reference area.

8. The three-dimensional display apparatus of claim 3, wherein the three-dimensional processing unit is a unit that, when the three-dimensional processing is performed on the object so as to have a predetermined parallax, performs the three-dimensional processing on the plurality of images such that a maximum parallax of the parallaxes of the corresponding points calculated in a reference area becomes less than or equal to the predetermined parallax.

9. The three-dimensional display apparatus of claim 1, wherein the three-dimensional processing unit is a unit that changes a position of the object in a direction orthogonal to a depth direction in the three-dimensional space based on the distance information such that the object is displayed at a position where overlapping of the object and the three-dimensional image on top of each other is prevented.

10. The three-dimensional display apparatus of claim 9, wherein the distance calculation unit is a unit that calculates a parallax of corresponding points between each of the plurality of images as the distance information.

11. The three-dimensional display apparatus of claim 10, wherein the distance information calculation unit is a unit that extracts a characteristic portion of the plurality of images and calculates the parallax of corresponding points from the characteristic portion.

12. The three-dimensional display apparatus of claim 1, further comprising a control unit for controlling the distance information calculation unit and the three-dimensional processing unit to respectively perform the calculation of distance information and the three-dimensional processing on the plurality of images and the object at a predetermined time interval.

13. The three-dimensional display apparatus of claim 1, further comprising a control unit for controlling the distance information calculation unit and the three-dimensional processing unit to respectively perform the calculation of distance information and the three-dimensional processing on the plurality of images and the object when optical systems of the imaging units are driven.

14. A three-dimensional display method for use with a three-dimensional display apparatus which includes a plurality of imaging units for obtaining a plurality of images having a parallax with respect to a subject viewed from different viewpoints by imaging the subject from different viewpoints, a three-dimensional processing unit for performing three-dimensional processing for three-dimensional display on the plurality of images and performing the three-dimensional processing on an object to be displayed in the three-dimensionally displayed three-dimensional image in a superimposed manner, and a display unit for performing at least the three-dimensional display of the three-dimensional image, the method comprising the steps of:
calculating distance information of the three-dimensional image;
changing a relative position of the object with respect to the three-dimensional image in a three-dimensional space based on the distance information such that overlapping of the object and the three-dimensional image on top of each other is prevented when the three-dimensional display is performed;

controlling the imaging units to image the subject at a predetermined time interval;

calculating an evaluation value which includes an evaluation value of at least one of a luminance and a high frequency component of the images obtained by the imaging units at the predetermined time interval; and performing the calculation of distance information and the three-dimensional processing on the plurality of images and the object when the evaluation value has changed by an amount exceeding a predetermined threshold value.

15. A non-transitory computer readable recording medium storing a program for causing a computer to perform a three-dimensional display method for use with a three-dimensional display apparatus which includes a plurality of imaging units for obtaining a plurality of images having a parallax with respect to a subject viewed from different viewpoints by imaging the subject from different viewpoints, a three-dimensional processing unit for performing three-dimensional processing for three-dimensional display on the plurality of images and performing the three-dimensional processing on an object to be displayed in the three-dimensionally displayed three-dimensional image in a superimposed manner, and a display unit for performing at least the three-dimensional display of the three-dimensional image, the program causing the computer to perform the steps of:

calculating distance information of the three-dimensional image;

changing a relative position of the object with respect to the three-dimensional image in a three-dimensional space based on the distance information such that overlapping of the object and the three-dimensional image on top of each other is prevented when the three-dimensional display is performed;

controlling the imaging units to image the subject at a predetermined time interval;

calculating an evaluation value which includes an evaluation value of at least one of a luminance and a high frequency component of the images obtained by the imaging units at the predetermined time interval; and performing the calculation of distance information and the three-dimensional processing on the plurality of images and the object when the evaluation value has changed by an amount exceeding a predetermined threshold value.

16. A three-dimensional display apparatus, comprising:

a plurality of imaging units for obtaining a plurality of images having a parallax with respect to a subject viewed from different viewpoints by imaging the subject from different viewpoints;

a three-dimensional processing unit for performing three-dimensional processing for three-dimensional display on the plurality of images and performing the three-dimensional processing on an object to be displayed in the three-dimensionally displayed three-dimensional image in a superimposed manner;

a display unit for performing at least the three-dimensional display of the three-dimensional image;

a distance information calculation unit for calculating distance information of the three-dimensional image;

an imaging control unit for controlling the imaging units to image the subject at a predetermined time interval;

an evaluation value calculation unit for calculating an evaluation value which includes an evaluation value of at least one of a luminance and a high frequency component of the images obtained by the imaging units at the predetermined time interval; and a control unit for controlling the distance information calculation unit and the three-dimensional processing unit to respectively perform the calculation of distance information and the three-dimensional processing on the plurality of images and the object when the evaluation value has changed by an amount exceeding a predetermined threshold value, wherein the three-dimensional processing unit is a unit that changes a relative position of the object with respect to the three-dimensional image in a three-dimensional space based on the distance information such that a positional relationship in which a portion or a whole of the object is hidden by the three-dimensional image is prevented when the three-dimensional display is performed.

* * * * *